United States Patent
Shukla et al.

(10) Patent No.: US 8,126,930 B2
(45) Date of Patent: Feb. 28, 2012

(54) MICRO-BUCKET TESTING FOR PAGE OPTIMIZATION

(75) Inventors: Ashish Shukla, Sunnyvale, CA (US); Mike Wexler, Santa Clara, CA (US); Vik Singh, San Jose, CA (US); Ethan Kan, Sunnyvale, CA (US); Deepa Joshi, Sunnyvale, CA (US); Ingrid Lestiyo, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 335 days.

(21) Appl. No.: 12/116,198

(22) Filed: May 6, 2008

(65) Prior Publication Data

US 2009/0281989 A1    Nov. 12, 2009

(51) Int. Cl.
  *G06F 17/30* (2006.01)
(52) U.S. Cl. ........................................................ 707/802
(58) Field of Classification Search .................. 707/803; 715/744
  See application file for complete search history.

(56) References Cited

U.S. PATENT DOCUMENTS

| | | | |
|---|---|---|---|
| 6,282,532 B1 | 8/2001 | Sandell | |
| 6,442,515 B1 * | 8/2002 | Varma et al. | 703/22 |
| 7,089,226 B1 | 8/2006 | Dumais et al. | |
| 7,168,051 B2 | 1/2007 | Robinson et al. | |
| 7,363,302 B2 | 4/2008 | Lester | |
| 7,424,478 B2 | 9/2008 | Licon et al. | |
| 2001/0034661 A1 | 10/2001 | Ferreira | |
| 2002/0113820 A1 | 8/2002 | Robinson et al. | |
| 2002/0120507 A1 | 8/2002 | Chanos et al. | |
| 2002/0156917 A1 | 10/2002 | Nye | |
| 2003/0036848 A1 | 2/2003 | Sheha et al. | |
| 2004/0205555 A1 | 10/2004 | Hind et al. | |
| 2004/0267806 A1 | 12/2004 | Lester | |
| 2005/0027705 A1 | 2/2005 | Sadri et al. | |
| 2005/0091111 A1 | 4/2005 | Green et al. | |
| 2005/0270311 A1 | 12/2005 | Rasmussen et al. | |
| 2006/0005137 A1 | 1/2006 | Jolley | |

(Continued)

FOREIGN PATENT DOCUMENTS

KR    10-2001-64265 A    7/2001

OTHER PUBLICATIONS

PCT International Search Report—PCT/US2009/002241 (dated Nov. 30, 2009) (3 pages).

(Continued)

*Primary Examiner* — Sheree Brown
(74) *Attorney, Agent, or Firm* — Martine Penilla Group, LLP

(57) ABSTRACT

Methods for optimizing webpage content by micro-bucket testing user customization to the webpage include presenting a plurality of modules at a webpage based on a request from a user. The modules define an intent of the webpage. A change defining customization to one or more modules within the webpage is detected. A test case representing the change is automatically generated. The generated test case is a modified webpage having the customization. The webpage is presented to a first segment of users as a control page and the modified webpage is presented to a second segment of users in response to a request for the webpage. User interaction by the first and segment of users is monitored at the webpage and the modified webpage to determine website metrics of the corresponding webpages. The website metrics is used in defining a new control page of the webpage from the modified webpage or retaining the webpage as the control page.

21 Claims, 6 Drawing Sheets

U.S. PATENT DOCUMENTS

| | | |
|---|---|---|
| 2006/0031771 A1* | 2/2006 | MacHeffner .................. 715/749 |
| 2006/0095331 A1 | 5/2006 | O'Malley et al. |
| 2007/0038567 A1 | 2/2007 | Allaire et al. |
| 2007/0162424 A1 | 7/2007 | Jeh et al. |
| 2007/0185768 A1 | 8/2007 | Vengroff et al. |
| 2007/0226198 A1 | 9/2007 | Kapur |
| 2007/0250492 A1 | 10/2007 | Angel et al. |
| 2008/0046312 A1 | 2/2008 | Shany et al. |
| 2008/0147487 A1* | 6/2008 | Hirshberg ...................... 705/10 |
| 2008/0215416 A1 | 9/2008 | Ismalon |
| 2009/0076887 A1* | 3/2009 | Spivack et al. .................. 705/10 |
| 2009/0183084 A1* | 7/2009 | Robertson ..................... 715/744 |
| 2010/0017289 A1 | 1/2010 | Sah et al. |
| 2010/0138452 A1* | 6/2010 | Henkin et al. ................ 707/803 |

OTHER PUBLICATIONS

Long, NPL "Google Hacking for Penetration Testers", Jul. 2004, Syngress.

* cited by examiner

MICRO-BUCKET TESTING FOR PAGE OPTIMIZATION

CROSS REFERENCE TO RELATED APPLICATION

This application is related to U.S. patent application Ser. No. 12/116,195, entitled "Algorithmically Generated topic pages," assigned to the assignee, which is incorporated herein by reference in its entirety for all purposes.

BACKGROUND

1. Field of the Invention

The present invention relates to web page content optimization, and more particularly, to optimizing page content by using changes contributed by users to facilitate automated micro-bucket testing of the changes.

2. Description of the Related Art

Internet searching has become ubiquitous with web navigation. During navigation, a query for a webpage is received at a server. A tool on the search engine is used to search a repository of information available to the search engine and return a webpage in response to the query. A webpage can include different types of content, sometimes organized in the form of modules. The modules in a webpage may be presented according to a design defined by an editor of the webpage. Typically, an editor of the webpage may attempt redesigns of webpage in order to optimize user interactivity and or traffic to the webpage. Entities that manage multiple webpages or sites, sometimes employ a team of editors, whose job is to make changes and bucket test the changes, in an effort to optimize user interactivity and user metrics associated with the use of the webpage or pages of a site.

As is evident, the design and content of the webpage is driven by editor changes, which may be the result of manual bucket testing. For example, when an editor determines that a change should be made, the editor goes through an elaborate process of identifying the content or modules, designing the change, and setting up the test environment to run the bucket tests. Then, manual analysis is performed to determine user's acceptability to the change. One drawback of this approach is that an immense amount of time and effort are spent in designing webpage changes, setting up the testing environment, and conducting analysis of the results. If the new webpages do not produce the intended optimizing result, the webpage has to be redesigned and the whole process is repeated. In short, current approaches are both cumbersome and labor intense.

It is in this context that embodiments of the invention arise.

SUMMARY

Embodiments of the present invention provide methods that enable optimizing webpage content by micro-bucket testing user contributions/changes for customization. The method employs an optimizing algorithm that operates to set-up and automatically perform micro-bucket testing. The method includes presenting a plurality of modules of a webpage based on a request from a user. The request can be in response to user navigation to the webpage or in response to a search, which generates a custom page related to a search query. The modules presented at the webpage define the content of the webpage.

A change to one or more modules within the webpage is detected. The change defines customization to the modules in the webpage, as performed by a user. The customization, as used herein, is in the form of a change. The change can include, but not limited to, addition of content, moving of modules, deleting content or modules, organizing existing modules or content, etc. Thus, a test case representing the change is automatically generated. The generated test case is presented as a modified webpage, having the customization. Micro-bucket testing of the change is performed by presenting the original webpage to a first segment of users as a control page and presenting the modified webpage to a second segment of users. User interaction by the first and second segment of users is monitored from each of the webpage (being the control page) and the modified webpage, to determine website metrics of the corresponding webpages.

If website metrics present criteria that indicates that the modified webpage has better performance, then the modified webpage becomes the control page. In one embodiment, many changes can occur by the many users that may be customizing the control page. For each of the customizations, modified webpages are set up for micro-bucket testing. If one of the modified webpages delivers metrics in line with desired results (e.g., such as increased traffic useful for monetization), then that modified webpage will be promoted as the control page. This process continues in an automated manner, so as to enable 10 s, 100 s, 1000 s, 100,000 s, etc., micro-bucket tests, using the modifications contributed by the many users that access the website page or pages.

Due to dynamic and interactive nature of the content in a webpage, it is essential to determine which of the changes to the content are good and desirable to users. Thus, the optimizing algorithm provides a tool which enables a plurality of users to contribute ideas for change and automatically bucket tests the suggested changes by presenting the changes to a plurality of users. The results from the automatic bucket tests are used to determine which of the suggested changes are more acceptable to the general user population. The feedback from users determines the optimal change or changes that can be incorporated into a webpage to increase the engagement of users and, thereby, user traffic to the webpage. As noted above, by increasing popularity, interactivity, user stay-time, and engagement, the website or webpages can more effectively be used for monetizing.

It should be appreciated that the present invention can be implemented in numerous ways, such as in the form hardware, software, combinations of software and hardware, methods, and program instructions that can be stored as computer readable media. Several inventive embodiments of the present invention are described below.

In one embodiment, a method for optimizing search webpage content, by micro-bucket testing user customization to the search webpage, is disclosed. The method includes presenting a plurality of search results at a search webpage in response to a search query. Along with the search results, a plurality of modules having content and media related to the search, is presented. The modules are presented in a region of the page, which is referred to as a "topic page." The content of the modules relate to a topic of the query.

For instance, if the search is related to "dogs", the search results are presented as commonly viewed links, and the topic page section presents various modules that relate to dogs. For clarity, the modules can define various categories. For the example "dog" topic, the various modules, by way of example, can include "dog news", "dog races", "dog hair care", "dog food", etc. Each of the modules are pre-arranged in a particular organization on the topic page, which defines a "control page". Changes to the topic page can include, for example, moving of modules to different locations, adding modules, removing modules, etc.

According to the algorithm, a change to one or more modules within the topic page is detected. The change may be due to customization provided at the topic page through user interaction. A test case representing the change is automatically generated. The generated test case is a modified topic page having the customization and represents the micro-bucket test of the topic page for the query. The change is then bucket tested by presenting the topic page as a control page to a first segment of users and by presenting the modified topic page to a second segment of users. User interactions by the first and second segment of users are monitored to determine website metrics of the topic page and the modified topic page.

The website metrics are used to dictate if the modified topic page should be a new control page (e.g., if the modified topic page has better user interactive performance and may be better for monetization). If not, the original topic page is retained as the control page. It should be understood that this example is of only one modification by one user, resulting in one micro-bucket test. In one embodiment, the many users can all be contributing changes, and those changes can automatically be micro-bucket tested, thus providing for refined enhancement, by many users, of the resulting control page. Thus, a multitude of micro-changes, tested by automatic micro-bucket testing can intelligently migrate a page (that can be modified/customized by users) to its optimal state.

In another embodiment, a method for optimizing webpage content by micro-bucket testing user customization to the webpage is disclosed. The method includes detecting a change to one or more modules within the webpage. The change defines customization of the webpage provided by user interaction. A test case representing the change is automatically generated. The generated test case is a modified webpage having the customization. The change is micro-bucket tested by presenting the webpage as a control page to a first segment of users and the modified webpage to a second segment of users in response to a subsequent request for the webpage. The modified webpage represents the micro-bucket test of the webpage. User interactions by the first and second segment of users are monitored to determine website metrics of the webpage and the modified webpage. Website metrics are used in defining a new control page of the webpage from the modified webpage or retaining the webpage as the control page.

Thus, the embodiments of the invention provide a tool to customize a webpage through changes to one or more modules within the webpage and the customized changes are presented back to the users to determine the popularity and acceptability of the customized changes. The change that is more popular with the users is used to establish a new control page having optimal content modules and is used as a base line for future mining and processing. The new control page substantially increases user engagement thereby making it a potential monetizing tool.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Figure 1:
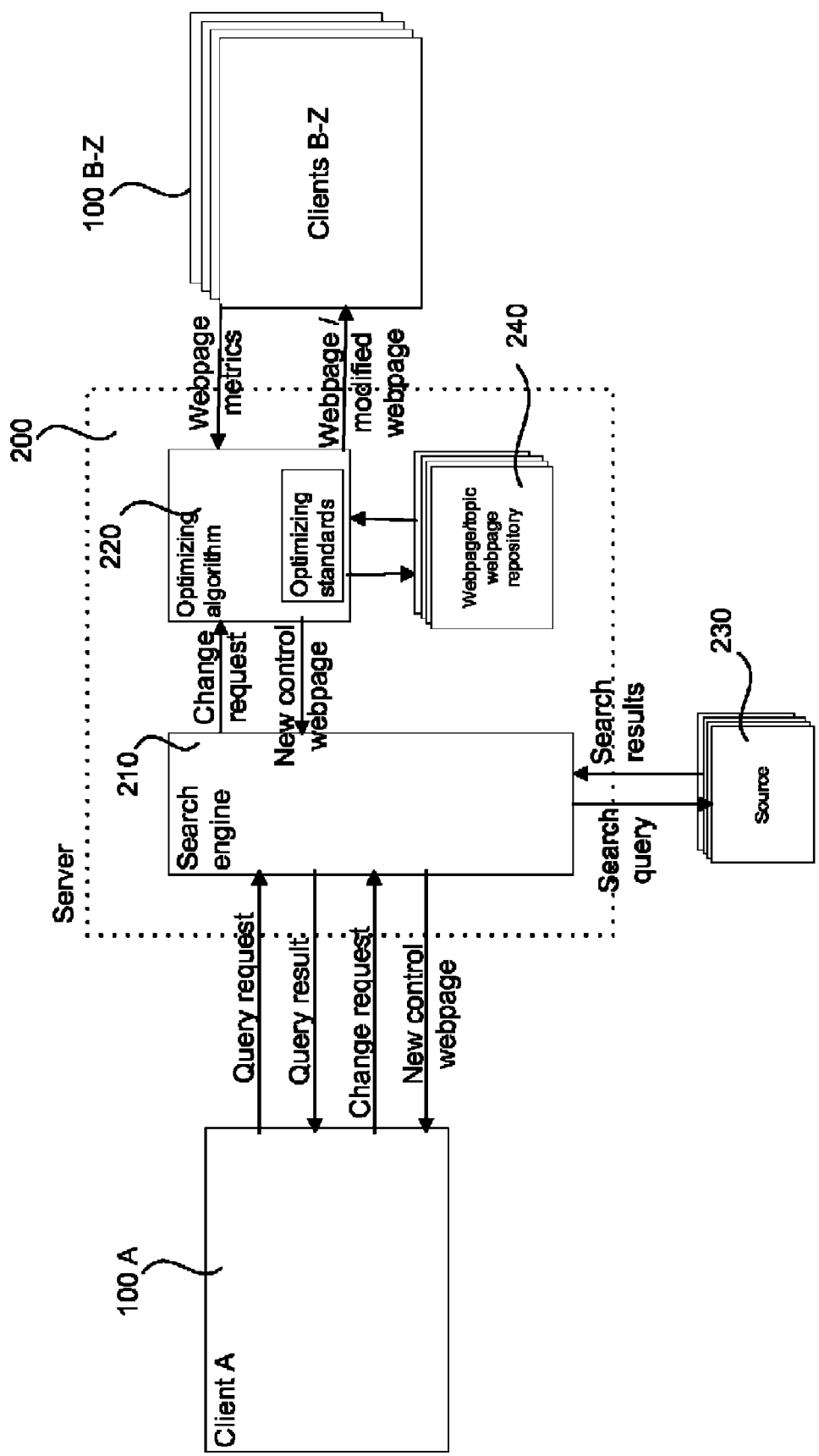
FIG. 1 illustrates a high-level block diagram of a generic computer system identifying various modules used in optimizing webpage content by micro-bucket testing, in accordance with one embodiment.

Broadly speaking, the embodiments of the present invention provide methods that enable optimizing webpage content using customizations provided by users, and automatically triggering micro-bucket testing of the user customizations/changes. The method is applicable to any webpage having content, and content defined in any format.

By way of example, the method can be applied to webpages that are automatically generated based on a search query. The search query defines a topic for conducting a search, and search results are generated, along with a topic page.

In accordance with the method, the query is received and is forwarded to a search engine on a server(s). The search engine identifies and returns standard search result links, and also presents a webpage (e.g., a topic page) in response to the query. The webpage includes a plurality of modules having content that relate to the query.

An optimizing algorithm defines a way of micro-bucket testing customizations or changes made to the webpage by users. The changes and customizations can take on many forms. Some examples may include adding modules, moving modules, adding content, removing content, formatting the presentation, etc. Users will be allowed to make such customizations or changes, so that the content is presented in the way they feel is best.

Of course, with many users viewing the webpage, the customizations/changes can grow substantially. According to the algorithm, a change to one or modules within the webpage is detected. The change represents the customization provided by the user interaction. A test case representing the change is automatically generated. The test case is a modified webpage having the customization. The change is then micro-bucket tested by presenting the webpage (e.g., the original or current highest ranking webpage format) as a control page to a first segment of users. The modified webpage is then also presented to a second segment of users. The modified webpage, as shown to the second segment of users, represents a micro-bucket test of the webpage.

User interaction by the first and second segment of users is monitored to determine the website metrics of the webpage and the modified webpage. Website metrics are used in defining a new control page for subsequent query from the modified webpage or retaining the webpage as the control page. For example, if the modified webpage increases user traffic to the webpage and enhances user engagement at the webpage, the modified webpage is elevated to be the current control page. In one embodiment, this process is designed to enable many changes/modifications made by many users to be automatically micro-bucket tested. When changes made by certain users merits addition to the control page, these changes are made automatically.

It should be understood that the optimizing algorithm can be in the form of a code running on one or more servers, or hardware and software. If the webpage is the result of a search, such as webpages generated for topics, the optimizing algorithm will also be available to the search engine code. However, the optimizing algorithm code does not have to be integrally coupled to the search engine logic.

Thus embodiments of the invention provide a tool that allows customization of a webpage, including search webpages, while continually optimizing the content by micro-bucket testing user changes. Due to dynamic and interactive nature of the content in a webpage, it is essential to determine which of the changes to the content are good and desirable to users. As will be described below, some changes are allowed to be automatically micro-bucket tested. Some content, however, may be sensitive or in bad taste, and some filtering can be implemented to remove such changes before or after micro-bucket testing. As used herein, micro-bucket testing should be broadly construed to include testing of changes. The changes may be made by users, editors, programmers, etc. The changes can take on many forms, and can include modifications, additions, deletions, arrangements, etc. As changes to a page are tested for even the smallest change, the term micro-bucket defines the testing of that changes, as compared to a control page. Thus, as minor (or major) changes are micro-bucket tested, the changes begin to impact and change the control page. Thus, it is possible for the changes by the various entities (or users), to start to impact the control page, which define a page with many overlapping changes. And, it is noted that the use of webpage should be broadly construed to include any type of page, not necessarily tied to a search page. Example pages include, for instance, front pages, user's customized pages (e.g., My Yahoo!), and other vertical content pages typically used by Yahoo! and others.

FIG. 1 illustrates a simplified block diagram of various modules of a computer system used in optimizing a webpage by micro-bucket testing user customization to the webpage, in one embodiment of the invention. The computer implemented system includes a client 100-A with a user interface to receive and transmit a query, such as a search query, to a server 200 over a network (not shown), such as the internet. The network connection may be wired or wireless. A search engine 210 on the server 200 receives the query, such as search query, from the client 100-A, and interacts with a plurality of sources 230 over the network (not shown) to identify and return a plurality of search results in a search webpage, in response to the search query.

In addition to the search results, plurality of modules with contents related to a topic of the search query are also returned. The modules are organized in a topic page on the search webpage. As mentioned earlier, the embodiments of the invention may be practiced on any type of webpage and is not restricted to a search webpage that returns a topic page. In a standard webpage, such as front page of a website, the results returned in response to a query include modules representing the content of the website. The modules are arranged in the webpage similar to the topic page of the search query. Each of the modules may include dynamic content and may be obtained from a different source 230.

Further, the contents within each module may be of different type including any one or more of text, audio, video, image, graphic, or any other type that can be rendered on the webpage. The modules within the topic page/webpage may be arranged in an order that may define the relevance of the module to the topic of the webpage.

The webpage may be a default webpage that was designed by an editor of the webpage and includes modules that can be customized. In addition to the modules that may be customized, the webpage may include one or more modules that may not be customized. Such modules may be locked so that customization of these modules is not enabled. One or more users of the webpage may customize the webpage by changing one or more modules in the webpage. The changes may include re-positioning of one or more modules, deletion of one or more modules and addition of one or more new modules.

When a user customizes the webpage by changing one or more modules, the change is detected and an automatic micro-bucket test case is triggered for the change. In one embodiment, the generated test case represents the change. The generated test case is a modified webpage that includes the customization. Broadly speaking, the generated test case is bucket tested to determine if the change is to be kept or discarded.

Traditional ways of changing the layout or contents of a webpage would include redesigning of a page or content, manually setting up the test environment and testing the change. This took up an enormous amount of editor/programmer time and effort, and if the change was unsatisfactory, the whole process had to be manually repeated. The current embodiments provide an alternate way of automatically testing a change to the webpage to determine if the proposed change should be implemented or not.

In one embodiment, an optimizing algorithm available to the search engine on the server is used in detecting the change to the webpage and generating the test case representing the change. The test case generated is a modified webpage including the change to the webpage. The optimizing algorithm may include a plurality of rules that establish optimizing standards for implementing the change. When the change is detected at the webpage, the optimizing algorithm reviews the change to determine if the change is acceptable based on the established standards. An automated review process within the optimizing algorithm reviews the change to ensure that the change does not contain banned words, is offensive, sensitive, and/or is received from a banned user.

A manual review process within the optimizing algorithm enables manual review of the change to ensure that there are no conflicts within the webpage due to the change. Upon satisfactory review, the modified webpage is stored in a topic/webpage repository 240 for subsequent query. If the review is unsatisfactory, the change is either discarded or manually resolved. The change is then bucket tested using the generated test case. The webpage without the change is a control page, which is presented to a first segment of users. The modified webpage is also presented to a second segment of users, in response to generation of subsequent search results for the query. The modified webpage acts as micro-bucket test of the webpage for the query. Additional changes to one or more modules within the webpage may be received enabling generation of additional test cases representing the changes, with each additional test case defined by a distinct modified webpage that acts as micro-bucket test for the webpage, for the query.

Due to the extensive use of the internet, there may be hundreds to thousands of micro-buckets representing thousands of changes for the webpage that may be bucket tested at any given time. The additional changes may be changes to the webpage or the modified webpage.

A plurality of clients 100 B-Z with respective user interfaces are engaged in interactivity that is tested. In response to a single change, the interactivity received from many users is monitored to conduct the automatic micro-bucket testing of the change. For instance, the first segment of users is directed to the webpage, which is initially implemented as a "control page" and the second segment of users is directed the modified webpage. User interactions by the first and second segment of users at the clients are monitored to determine website metrics. Some of the website metrics that may be determined by monitoring user interaction that may include linger time, abandonment rate, click-throughs, and other user feedback.

The webpage metrics are used in determining if a new control page for subsequent query should be defined from the modified webpage or if the webpage should be retained as the control page. In one embodiment, the webpage metrics are used in determining a popularity rating for the webpage and the modified webpage and if the modified webpage has the highest popularity rating, then the modified webpage is used as the new control page for subsequent query, otherwise the webpage is retained as the control page. The new control page or the control page is used in increasing user traffic and enhancing user engagement. The new control page or the control page acts as a base line and may be used to iteratively refine the contents based on additional changes to the webpage. The refined webpage enhances user engagement and user traffic.

Figure 2A:
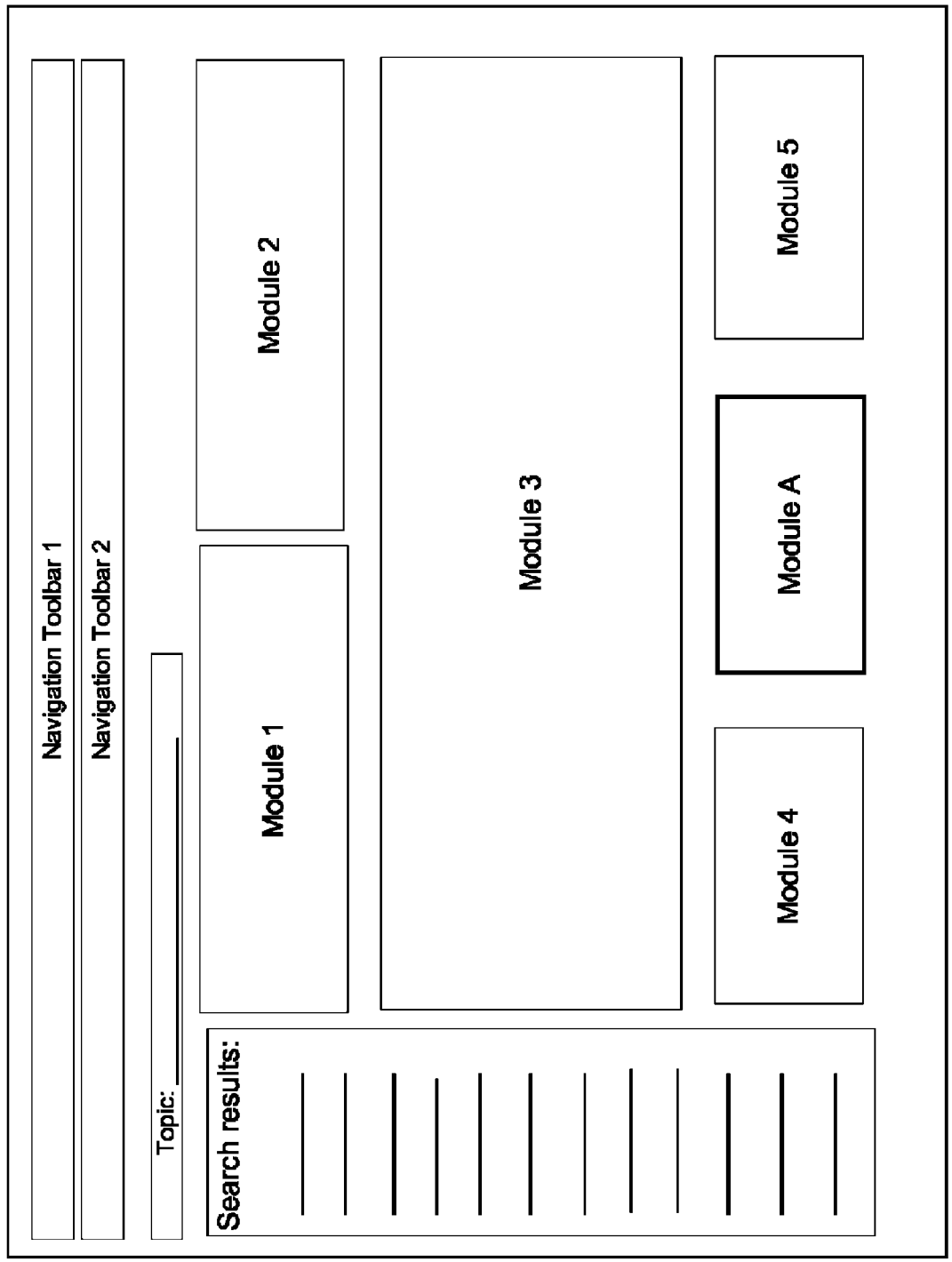
FIGS. 2A, 2B and 2C illustrate a simple block view of a search webpage with a plurality of content modules with changes performed by a plurality of users, in accordance with one embodiment.
Figure 2B:
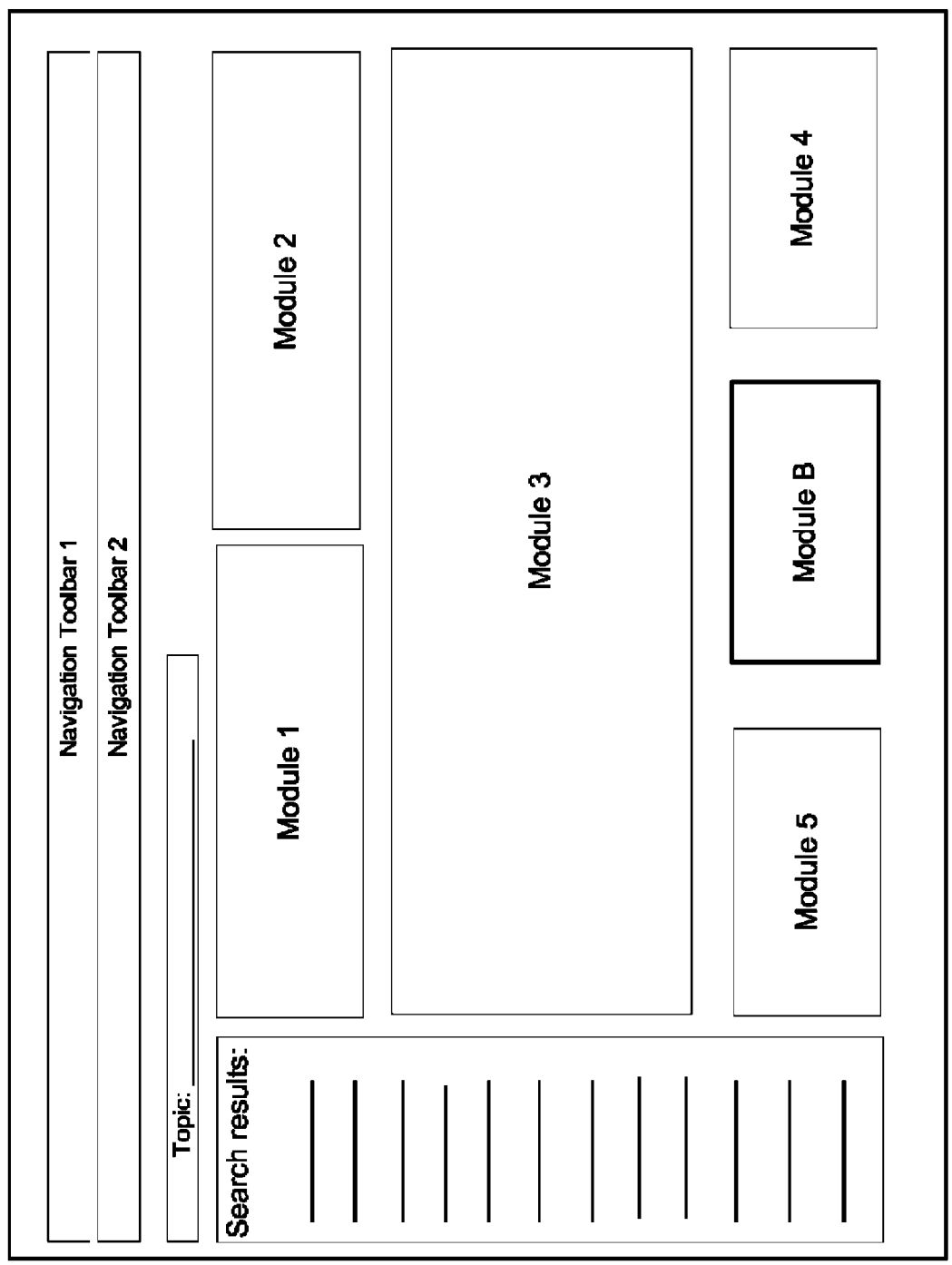
Figure 2C:
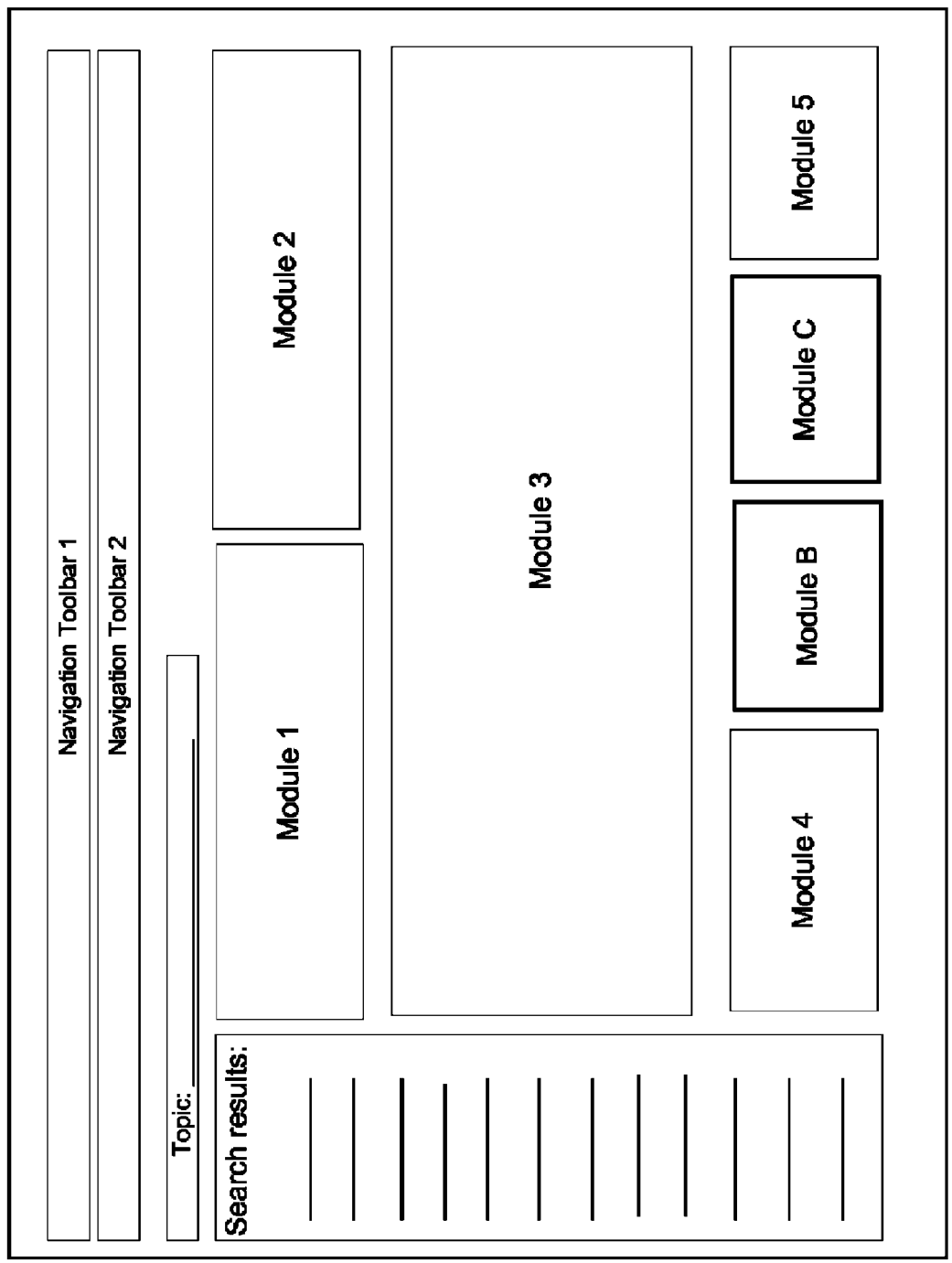

FIGS. 2A-2C illustrate simplified block diagrams of a typical search webpage with changes used in implementing an aspect of the current invention, in one embodiment. FIG. 2A illustrates a search webpage with search results matching a search query. In addition to the search results, the search webpage may include a plurality of modules that match a topic of the query. The plurality of modules may be presented in a topic page alongside the search results. The search webpage may be a default search webpage that is generated automatically. In addition to the existing plurality of modules, a user, user A, desiring to customize the search webpage adds a new module, module A, to the topic page. The content of module A is related to the topic(s) of the query and may be of any type that can be rendered on the webpage. In one embodiment, module A may be positioned anywhere on the search webpage and is not restricted to the location illustrated in FIG. 2A.

At the same time user A adds module A, user B may desire to customize the same search webpage by adding a new module, module B, to the topic page, as illustrated in FIG. 2B. Like module A, module B may be located anywhere on the topic page and may include content that is related to the topic of the query. The contents of module B may be of any type that can be rendered on the webpage including audio, video, graphic, text, etc. Further, the content of module A may or may not be the same type as the content of module B. In addition to the addition of a new module, user B may reposition module 4 and module 5 in the topic page.

A third user C may desire to customize the same search webpage by incorporating modules B and C into the topic page, as illustrated in FIG. 2C. The content of module B is similar to the module B of FIG. 2B but the location of module B may or may not be similar to the module B of FIG. 2B. The content of module C may be of any type that can be rendered on the webpage. Module C may include content type that may be different from that of modules A and B and may be located anywhere within the topic page. In order to determine which of these changes are optimal to be included in the topic page of the search webpage during subsequent generation of search results using the query, an optimizing algorithm is used.

The optimizing algorithm includes logic to detect the changes at the one or more modules in the topic page of the search webpage and to generate a test case for each of the change detected at the topic page. The test case defines the customization provided by user interaction and is a modified topic page that includes the customization. The modified topic page represents a micro-bucket test of the topic page for the query. A bucket test is performed for the change using the test case. As a result, the topic page is presented as a control page to a first segment of users and the modified topic page is presented to a second segment of users when subsequent search webpage is generated for the query.

In one embodiment, micro-bucket testing is a method used for gauging the impact of a change to a website's metrics. The website, as described in this embodiment, is a site where the search webpages are rendered. In another embodiment, the website can be any webpage having content, not necessarily generated in response to a search query (e.g., such as pages created by website programmers and editors).

In one embodiment, micro-bucket testing is conducted by running two or more versions of a particular webpage (or a set of webpages) and website metrics are obtained based on user interactions. The metrics may be used to measure the difference in clicks, traffic, transactions, and other user interactions between the versions. One version, for example, may be a control version. In a simple embodiment, two versions of a webpage can include the original topic page and a modified topic page. The website metrics gathered, by way of detected user interaction, can be used to deduce user satisfaction of a webpage, linger time, abandonment rate, click-throughs, other user feedback, etc.

In one embodiment, for instance, about 25% of the web traffic may be directed to the webpage with the modified topic page, and the remaining, about 75% of the web traffic, is directed to the webpage with the original topic page. The user interactions at each of the user interfaces are tracked to obtain the website metrics. The website metrics are used in identifying a new control page from the modified topic page or retaining the topic page as the control page during subsequent generation of results, for the query. The website metrics identify the optimal change that the majority of the users prefer and/or approve, thus defining constantly changing website that mirrors user's interactivity. Such system, in one embodiment, also provides a platform for better commercializing and monetizing the functionally of the site.

The optimizing algorithm performs the micro-bucket test to determine which change is preferred, by first classifying the module within topic page into one of two categories. The topic page of the search webpage may include modules with contents that may be time critical. For instance, the topic page of the search webpage may include a module covering a political event. The content of this module may include coverage of a presidential debate between the candidates of a party which is time critical. Each of the modules in the topic page is classified into one of the two categories based on the time critical needs associated with the contents in the modules. In one embodiment, a module in the topic page may be classified as "hot" or "normal" based on the time sensitive nature of the contents of the module within the topic page.

Upon classifying the modules in the topic page, the optimizing algorithm (algorithm) reviews the change to ensure that the change complies with established standards defined within the algorithm. The algorithm performs two types of reviews—an automated review and manual review. An automated review is performed by the algorithm and the manual review is performed by a user. For the modules in the topic page of the search webpage that are classified as normal, the optimizing algorithm performs the automated review and the manual review prior to the generation and presentation of the test case. For modules that are classified as hot, the optimizing algorithm performs the automated review prior to the generation of the test case and the manual review after the generation and presentation of the test case at the search webpage. This is due to the fact that the manual review may take longer time and the change has to be presented to the users faster due to the time sensitive nature of the contents.

During the automated review process, the optimizing algorithm analyzes the change to determine if the change is acceptable or unacceptable. If the change is acceptable, the optimizing algorithm continues with the manual review process. During the manual review process, the change is further analyzed to determine if any conflicts exist within the module or between the module with the change and other modules within the search webpage. For instance, a module that does not relate to the topic of the query may have been incorporated during customization. In another instance, a duplicate module may have been incorporated into the topic page during customization. If a conflict exists, the manual review process will try to get the conflict resolved. If the conflict cannot be resolved by the manual process, the change will be discarded and will not be considered during the bucket test. If the conflict can be successfully resolved, a test case is generated for the change and is included in the micro-bucket testing.

If, on the other hand, during the automated review process, the change is found to be unacceptable, the automated review process will discard the change and a test case will not be generated for this change. For instance, if the change includes bad or banned words, foul language, banned users, etc., the optimizing algorithm will automatically discard the change during the automated review process and a test case is not generated for this change. Thus, the quality of the change and that of the modules within the topic page is preserved while enabling user customizations of the topic page. Although the embodiments of the invention have been described in detail with respect to search webpage, the teachings of the invention can be extended to the customization of any type of webpage.

In cases where a module is classified as hot, any change to the module or module content has to be made available to the users immediately as the content of the module is time sensitive. In this case, if the change has to undergo micro-bucket testing prior to presenting the change to the users, the implementation of the change will take too long making the change irrelevant.

In order to overcome this drawback, the classification of the module is used to ensure that the change is provided in a timely fashion. Accordingly, in one embodiment, when one or more modules in a topic page with time sensitive contents are changed, the classification of the module(s) is used to determine the nature of content in the module(s). An automated review of the change is performed by the algorithm to ensure it complies with the established standards. If the change is unacceptable, the change is discarded and no test case is generated for this change. If the change is acceptable, then a test case is generated with the change. The test case is the modified topic page. In this embodiment, the original topic page is preserved in a topic page/webpage repository for bucket testing later. Since the contents of the module with the change is considered time sensitive, the modified topic page with the change to the time critical module is presented to the users immediately after the automated review.

The time sensitive content of the module may provide conflicts with other modules. These conflicts are resolved during the manual review process. The manual review is performed after presenting the change to the users. In the manual review process, the optimizing algorithm reviews the change to determine if the change causes any conflict to the existing contents of a module or with other modules. If the conflict remains unresolved, the change is discarded. In this situation, the original topic page is retrieved for presenting during generation of subsequent search results for the query.

After successful review of the change, micro-bucket testing is performed by presenting the search webpage with the original topic page as a control page to a first segment of users and the search webpage with the modified topic page to a second segment of users. The user interactions are monitored and a plurality of website metrics are gathered. As mentioned earlier, the micro-bucket testing is performed by presenting the webpage and modified webpage, and directing a select amount of users (about 5-10%) to each of the modified webpages for a pre-set period of time (for example, about 1 hour), and tracking the website metrics through user interactions at the webpage and the modified webpage(s).

If the popularity rating of the modified webpage is high, then the new control page is defined from the modified webpage. If, on the other hand, the popularity rating of the control webpage is high, then the control webpage is retained as the control page. The new control page will then establish a baseline for future generation of search results for the query. It should be noted that the change can be received from a plurality of users. As a result, the process of detecting changes from multiple users, reviewing changes to ensure the quality is maintained and micro-bucket testing the changes to determine the most popular and preferred webpage, with the optimal change(s), continues as more changes are received and the control page is further refined.

The new control page keeps generating high quality content, which mirrors user desired changes. Due to the increased user engagement, the refined control page may be used for monetizing the webpage, while presenting the most up to date user content and presentation.

The embodiments of the invention may also be used in enhancing the quality of a webpage that is decreasing in popularity. A control page decreasing in popularity over time, is detected. The control page includes a change to one or more modules of a search webpage that has undergone review and test. The popularity of the control page may reduce in popularity due to lack of or reduced user interaction at the control page. After an initial change, the control page may not have been refined any further or often. An optimizing algorithm (algorithm) may be used to boost the popularity of this control page. The optimizing algorithm identifies a default search webpage associated with the control page. The default webpage may have been generated in response to an initial search query and may be stored in a topic page/webpage repository, and may be available to the algorithm. The default search webpage includes a plurality of modules with substantially enhanced user interaction. The one or more modules of the default search webpage may include dynamic content that is updated periodically.

Upon identifying the control page with waning popularity, the algorithm is used to identify the default search webpage associated with the control page and to determine the difference between the control page and the default search webpage. One or more of the differences available in the default search webpage are identified. The identified differences are then reviewed by an automated review process and manual review process to ensure the differences meet the established standard of the algorithm. The differences are then incorporated into the control page.

The incorporation of the differences is detected as a change to the control page and the algorithm automatically generates a test case for the change by creating a modified webpage. The change is then micro-bucket tested by presenting the control page to a first segment of users and the modified webpage to a second segment of users and the user interaction by the first and second segment of users is monitored to determine website metrics. The website metrics is used to define the new control page from the modified webpage or retain the control page for subsequent generation of search results using the query. The change to the control page may enhance the popularity of the webpage.

Figure 3:
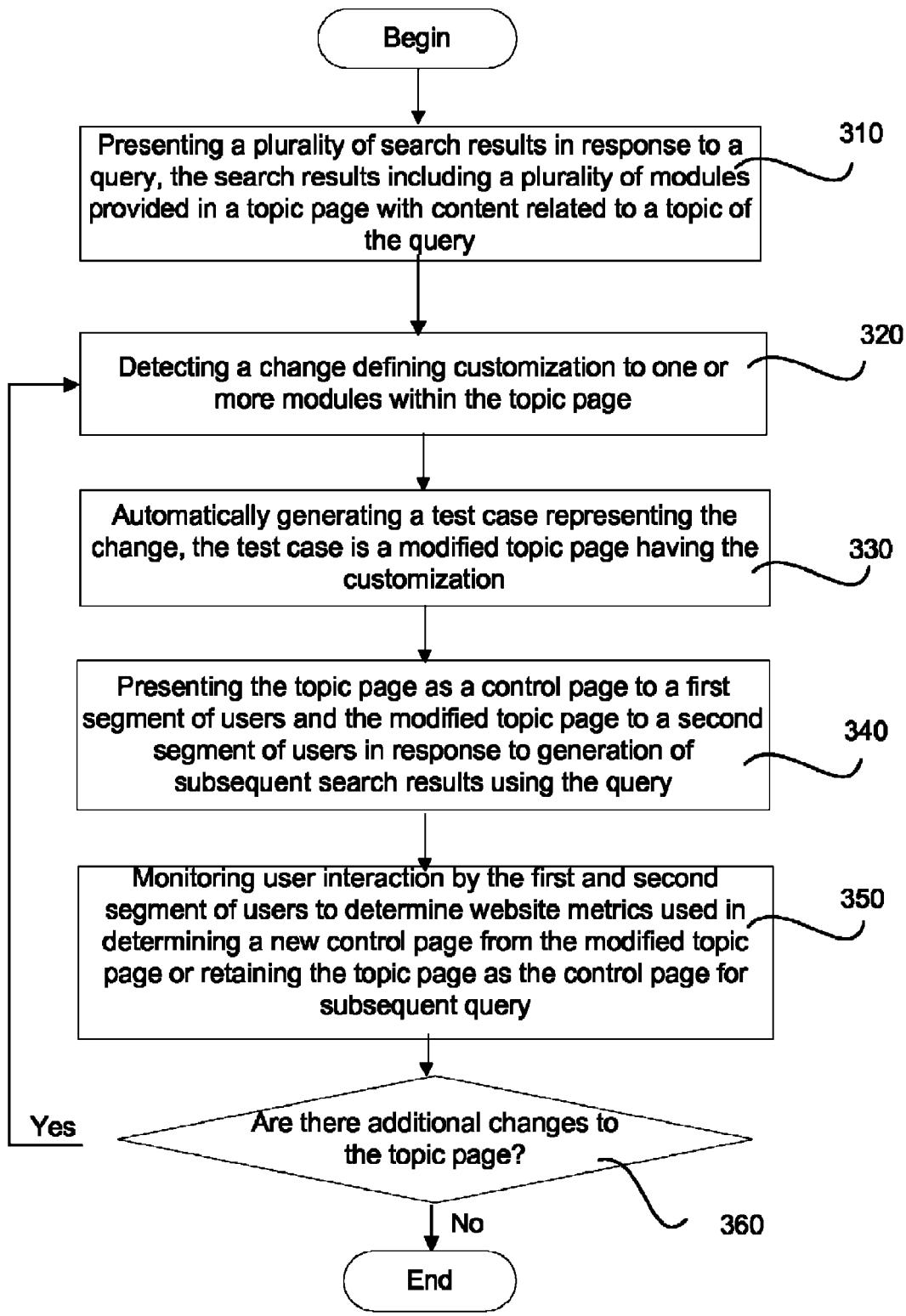
FIG. 3 illustrates a flowchart of process operations involved in optimizing pages contributed by users using micro-bucket testing, in one embodiment of the invention.

FIG. 3 illustrates method operations involved in optimizing search webpages customized by users through micro-bucket testing. The method begins at operation 310 where a plurality of search results are presented in response to a search query. The search results may be obtained from a plurality of sources and includes a plurality of modules. The modules relate to a topic of the query and may be organized in a topic page within the search webpage. One or more of the modules within the topic page may have dynamic content that may be updated periodically. The modules may be placed in the topic page based on an order of priority that may define the relevancy of the modules to the search query, or by some predefined ordering.

A change to one or more modules is detected at an optimizing algorithm, as illustrated in operation 320. The change defines customization of the topic page within the search webpage. The change is used to enhance the quality of the webpage so as to engage the users at the search webpage. The change may include one or more of addition or deletion of one or more module, re-positioning of one or more modules within the topic page.

The optimizing algorithm is used to automatically generate a test case representing the change to one or more modules of the topic page, as illustrated in operation 330. The generated test case is a webpage with a modified topic page. Prior to the generation of the test case, the optimizing algorithm reviews the change to ensure that the change is acceptable and complies with standards established within the optimizing algorithm. The optimizing algorithm engages both an automated review process and a manual review process. The automated review process ensures that the change does not include any banned words and/or are provided by banned users. If the change includes any banned words and/or is obtained from a banned user, the optimizing algorithm automatically discards the change and ensures that a test case is not generated for this change for bucket testing. If, on the other hand, the change is acceptable, the change is subjected to a manual review process based on the category associated with the one or more modules of the webpage impacted by the change.

If the module includes time sensitive content the change is immediately presented to the users by generating a test case as a modified topic page representing the change, and the manual review process can be performed after micro-bucket testing. If the module does not include time sensitive content, the change is subjected to the manual review process and is then micro-bucket tested. The manual review process ensures that there are no conflicts within the webpage due to the change. If there are any conflicts, the manual review process tries to get the conflict resolved so that the change can be used in generating a test case for micro-bucket testing. If the conflict cannot be resolved through manual review process, the optimizing algorithm automatically discards the change and ensures that the change is not used in generating test cases for bucket testing.

Upon successful review of the change, the optimizing algorithm generates a test case for the change. The test case is a modified topic page having the customized change. The change is then bucket tested by presenting the search webpage with the original topic page as a control page to a first segment of users and the search webpage with the modified topic page (modified search webpage) to a second segment of users in response to generation of subsequent search results using the query, as illustrated in operation 340.

The user interaction by the first and second segment of users is monitored to determine website metrics of the topic page and the modified topic page. The website metrics is used in determining if a new control page for the search webpage for subsequent generation of search results for the query is to be defined from the modified topic page or if the topic page can be retained as the control page, as illustrated in operation 350. The new control page or control page provides the optimal change desired and approved by the users thereby enabling engagement of users at the search webpage. The process of receiving a change, reviewing for quality, generating and presenting test cases and monitoring the user interaction for the test cases is continued as long as more changes are received, as illustrated in decision point 360.

The new control page or the control page is established, depending on the website metrics, as a base line search webpage for subsequent searches for the query. The search webpage is refined continuously making the search webpage more desirable to users thereby enhancing user engagement at the search webpage as the new control page reflects the user's interest and customization making this an effective marketing tool for monetization. Additionally, the dynamic content is maintained fresh and current even when there are rapid changes to the desired content.

Figure 4:
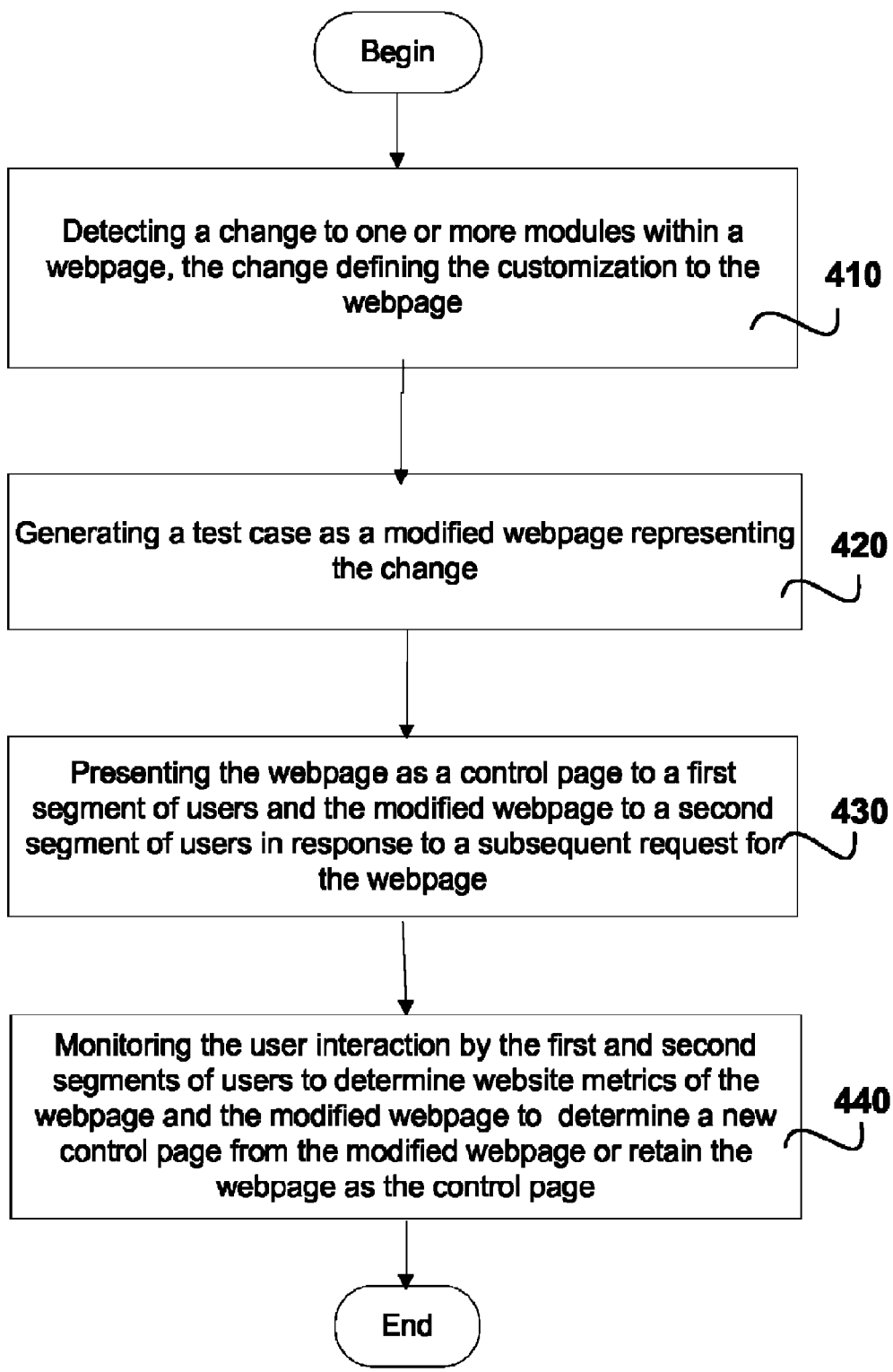
FIG. 4 illustrates a flowchart of process operations involved in boosting popularity of a waning webpage with changes contributed by users using micro-bucket testing, in an alternate embodiment of the invention.

FIG. 4 illustrates the method operations involved in optimizing a webpage customized by users through micro-bucket testing, in an alternate embodiment of the invention. The method begins at operation 410 where a change to one or more modules of a webpage is detected at an optimizing algorithm. The webpage may be a front page for a website or may be any other available webpage. The modules in the webpage are related to the intent of the webpage. The change is reviewed through an automated review process and a manual review process to ensure that the change meets standards established within the algorithm. Upon successful review, a test case is generated for the webpage with the change. The generated test case is a modified webpage representing the change, as illustrated in operation 420.

The change is then micro-bucket tested by presenting the original webpage as a control page to a first segment of users and the modified webpage to a second segment of users. The presenting of the webpage and the modified webpage is in response to a subsequent request for the webpage, as illustrated in operation 430. User interaction by the first and second segment of users at the webpage and the modified webpage is monitored, as illustrated in operation 440. The user interactions are used in determining website metrics. The website metrics are used to determine which of the two versions of the webpage is more popular with the users. The popularity of the two versions of the webpage is used to define a new control page or retain the control page. The process concludes with the establishing of the new control page or the control page as the base line webpage for subsequent requests for the webpage.

Thus, the embodiments of the invention provide a tool for generating customized webpage that is rich in content and relevant to the user while maintaining the high quality of the webpage. By allowing individual user customizations, users are engaged in boosting the popularity of the webpage while enhancing user experience. The changes requested by users during customization are automatically reviewed to ensure that the high quality of the webpage is maintained. The customized webpage may be used as a good monetizing tool due to the enhanced user engagement.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for optimizing a search webpage content by micro-bucket testing user customization to the search webpage, comprising:

presenting a plurality of search results and modules at a search webpage by a processor of a computing system in response to a query, wherein the modules are provided and have a layout in a topic page, the modules having content related to different categories of a topic of the query, the layout of the modules in the topic page defining an order for displaying the modules;

detecting a change to one or more modules within the topic page by the processor, the change defining customization provided by a user through user interaction at the topic page, the customization resulting in change to the layout of the modules in the topic page;

automatically generating a test case representing the change by the processor, the test case being a modified topic page having the customization;

presenting the topic page as a control page to a first segment of users and the modified topic page to a second segment of users during a same period of time by the processor in response to a subsequent search query, the modified topic page representing a micro-bucket test of the topic page for the query; and monitoring user interaction by the first and second segment of users at the topic page and the modified topic page during the same period of time by the processor to determine website metrics of the topic page and the modified topic page, the website metrics used in defining a new control page for subsequent search query from the modified topic page or retaining the topic page as the control page, wherein the website metrics are used to iteratively refine the topic page and generate an optimal topic page.

2. The method of claim 1, further including, receiving additional changes to one or more modules within the topic page, the additional changes enabling generation of one or more additional test cases for the changes, the additional test cases being one or more modified topic pages;

presenting the topic page as the control page to the first segment of users and the one or more modified topic pages to the second and subsequent segments of users in response to generation of subsequent search results using the query, the one or more modified topic pages representing micro-bucket tests of the topic page for the query; and monitoring user interaction by the first, second and subsequent segments of users to determine website metrics of the topic page and the one or more modified topic pages, the website metrics used in defining a new control page for subsequent search query from the one or more modified topic pages or retaining the topic page as the control page.

3. The method of claim 1, wherein change to the modules is dynamic.

4. The method of claim 2, wherein the changes are obtained from a plurality of users at a given period of time and wherein the changes are to one or more modules or content in the topic page or the modified topic page.

5. The method of claim 1, wherein the change includes one or more of adding a module, deleting a module and re-positioning a module within the topic page or the modified topic page.

6. The method of claim 1, wherein detecting a change to one or more modules further including, classifying each of the plurality of modules within the topic page into a category based on time critical needs associated with the content of the corresponding module; and reviewing the change to the one or more modules based on the classification associated with the contents of each of the plurality of modules, wherein the change includes addition of a module with content related to the topic page.

7. The method of claim 6, wherein reviewing the change is through any one or combination of a manual review process and an automated review process based on the classification of the topic page, wherein the manual review process and automated review process are captured using a processor, and wherein the automated review process includes automatically discarding the change when the change is unacceptable, the discarding of the change preventing generation of a test case for the change.

8. The method of claim 7, wherein the automated review process is performed prior to the generation of the test case.

9. The method of claim 7, wherein the manual review process further including,
  determining any conflict encountered at the topic page based on the change; and
  resolving the conflict at the topic page, the resolving captured using a processor,
  wherein when the conflict is unresolved, the manual review process includes automatically discarding the change and discarding the test case generated for the change.

10. The method of claim 9, wherein the manual review process is performed after the generation and presentation of the modified topic page with the change based on the classification of the topic page, wherein the content of the modules in the topic page are time critical content.

11. The method of claim 1, further including locking one or more modules in the topic page, the locking preventing the one or more modules from being changed or deleted.

12. A computer-implemented method for optimizing webpage content by micro-bucket testing user customization to the webpage, comprising:
  detecting a change to one or more modules within the webpage by a processor of a computing system, the modules are provided and have a layout in the webpage, the layout of the modules in the webpage defining an order for displaying the modules, the change defining customization provided by a user through user interaction at the webpage, wherein the customization resulting in a change to the layout of the modules in the webpage;
  automatically generating a test case representing the change by the processor, the test case being a modified webpage having the customization;
  presenting the webpage as a control page to a first segment of users and the modified webpage to a second segment of users during a same period of time in response to a subsequent request for the webpage by the processor, the modified webpage representing a micro-bucket test of the webpage; and
  monitoring user interaction by the first and the second segment of users at the webpage and the modified webpage by the processor during the same period of time to determine website metrics of the webpage and the modified webpage, the website metrics used in defining a new control page from the modified webpage or retaining the webpage as the control page, wherein the website metrics are used to iteratively refine the webpage and generate an optimal webpage.

13. The method of claim 12, further including,
  receiving additional changes to one or more modules within the webpage, the additional changes enabling generation of one or more additional test cases for the additional changes, the additional test cases being one or more modified webpages having the customization;
  presenting the webpage as the control page to the first segment of users and the one or more modified webpages to the second and subsequent segments of users in response to request for the webpage, each modified webpage presented to a distinct segment of users, the one or more modified webpages representing micro-bucket tests of the webpage; and
  monitoring user interaction by the first, second and subsequent segments of users to determine website metrics of the webpage and the one or more modified webpages, the website metrics used in defining a new control page for subsequent request of the webpage from one or more modified webpages or retaining the webpage as the control page.

14. The method of claim 13, wherein the changes are obtained from a plurality of users at a given period of time and wherein the changes are to one or more modules in the webpage or to one of the modified webpages and wherein the changes include one or more of adding a module, deleting a module and re-positioning a module within the webpage or one of the modified webpages.

15. The method of claim 12, wherein detecting a change to one or more modules further including,
  reviewing the change based on a classification associated with the webpage, the classification is based on time critical need of the content of the webpage, wherein the change includes addition of a module with content related to the webpage.

16. The method of claim 15, wherein reviewing the change is through any one or combination of a manual review process and an automated review process based on the classification of the webpage,
  wherein the manual review process and the automated review process are captured using a processor, and wherein the automated review process includes automatically discarding the change when the change is unacceptable, the discarding of the change preventing generation of a test case for the change.

17. The method of claim 16, wherein the automated review process is performed prior to the generation of the test case.

18. The method of claim 16, wherein the manual review process further including,
  determining any conflict encountered at the webpage based on the change; and
  resolving the conflict at the webpage, the resolving captured using a processor;
  automatically discarding the change and the test case generated for change when the conflict is unresolved.

19. The method of claim 18, wherein the manual review process is performed after the generation and presentation of the modified webpage with the change based on the classification of the webpage, wherein the content of the one or more modules in the webpage are time critical content.

20. The method of claim 12, further including locking one or more modules in the webpage, the locking preventing the one or more modules from being changed or deleted.

21. A computer-implemented method for optimizing search webpage content by micro-bucket testing user customization to the search webpage, comprising:
  detecting a search webpage with low user interactivity using a processor of a computing system, the search webpage having a plurality of search results and modules with content from a plurality of content sources, the modules are provided and have a layout in the search webpage, the layout of the modules in the search webpage defining an order for displaying the modules;
  identifying a default search webpage for the search webpage from a webpage repository by the processor, the default search webpage having the plurality of modules with active user interaction, wherein one or more of the plurality of modules include dynamic content that is updated periodically;
  determining difference between the search webpage and the default search webpage by the processor;
  incorporating the difference into the search webpage by the processor, the incorporation of the difference defining change to the one or more of the plurality of modules within the search webpage, wherein the change defines customization and wherein the change results in change to the layout of the modules in the search webpage;

automatically generating a test case representing the change by the processor, the test case being a modified search webpage having the customization;

presenting the search webpage as a control page to a first segment of users and the modified search webpage to a second segment of users during a same period of time in response to a subsequent request for the search webpage by the processor, the modified search webpage representing a micro-bucket test of the search webpage; and monitoring user interaction by the first and second segment of users at the search webpage and the modified search webpage during the same period of time by the processor to determine website metrics of the search webpage and the modified search webpage, the website metrics used in defining a new control page from the modified search webpage or retaining the search webpage as the control page, wherein the website metrics are used to iteratively refine the webpage and generate an optimal search webpage.

* * * * *